March 26, 1929.　　　J. C. WATSON　　　1,706,831
SOD CUTTING MACHINE
Filed Nov. 21, 1927　　　3 Sheets-Sheet 1
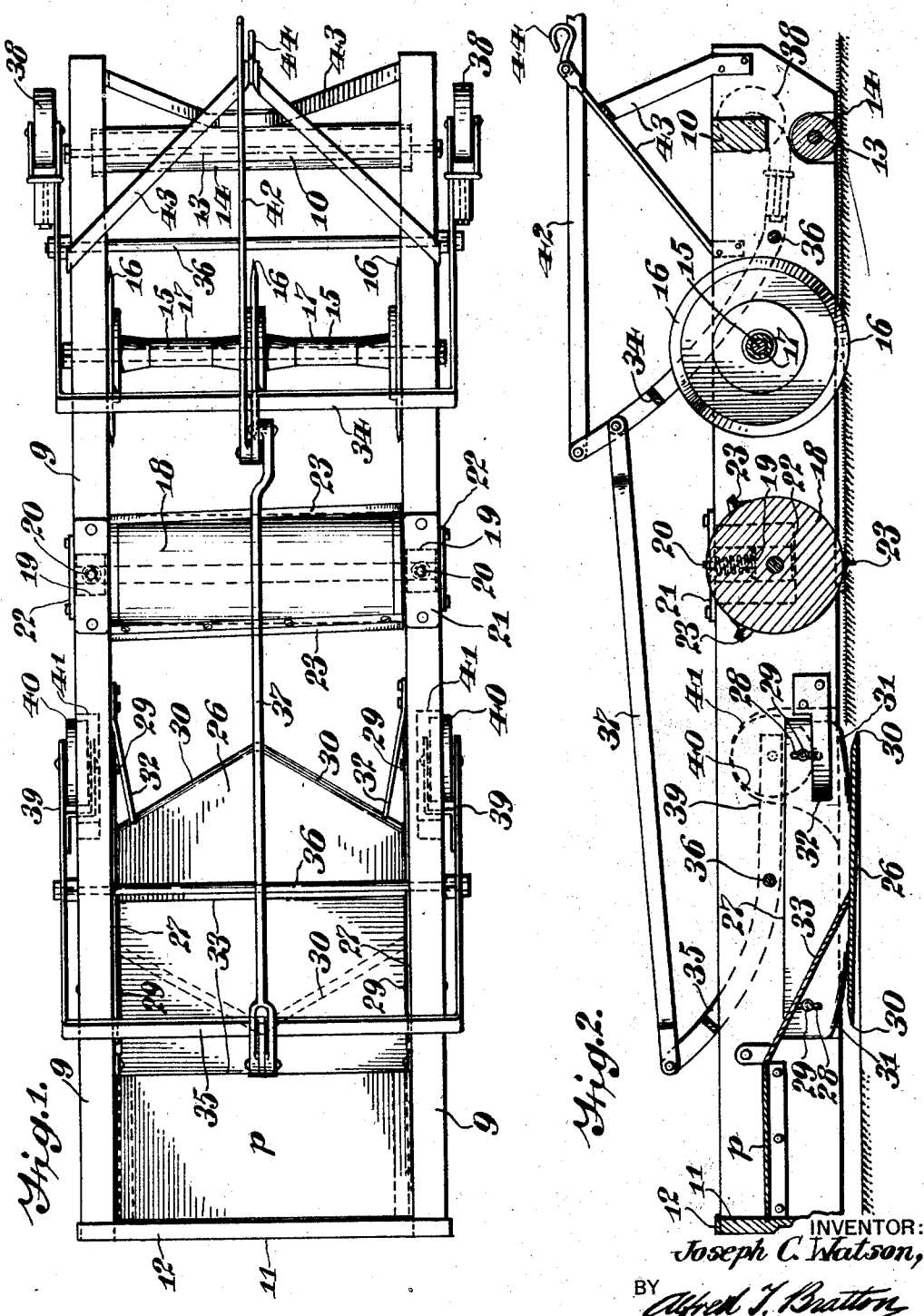
INVENTOR:
Joseph C. Watson,
BY Alfred T. Bratton
ATTORNEY March 26, 1929.    J. C. WATSON    1,706,831
SOD CUTTING MACHINE
Filed Nov. 21, 1927    3 Sheets-Sheet 2
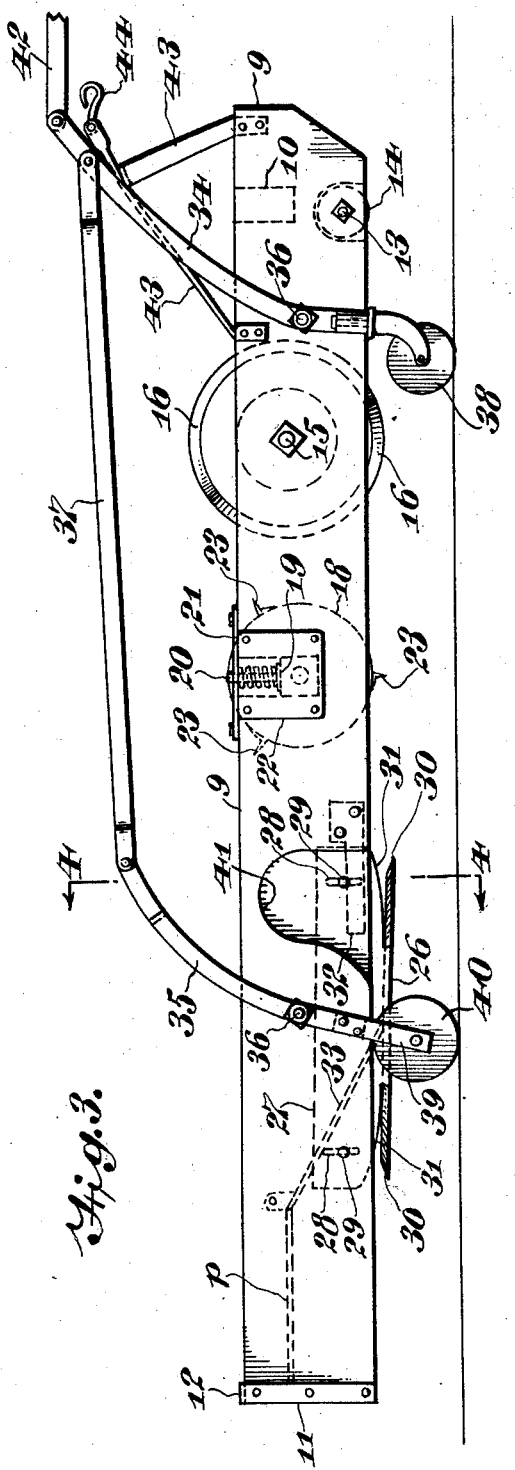
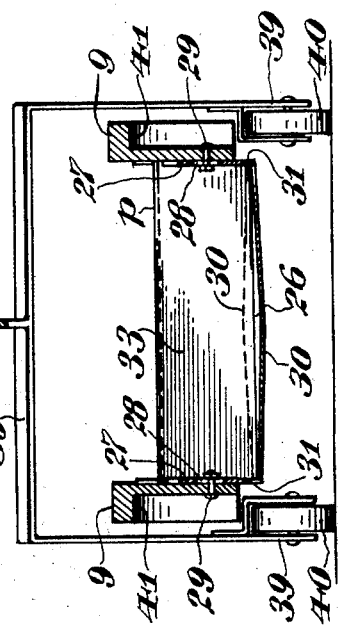
INVENTOR:
Joseph C. Watson,
BY Alfred T. Bratton
ATTORNEY March 26, 1929.　　J. C. WATSON　　1,706,831
SOD CUTTING MACHINE
Filed Nov. 21, 1927　　3 Sheets-Sheet 3
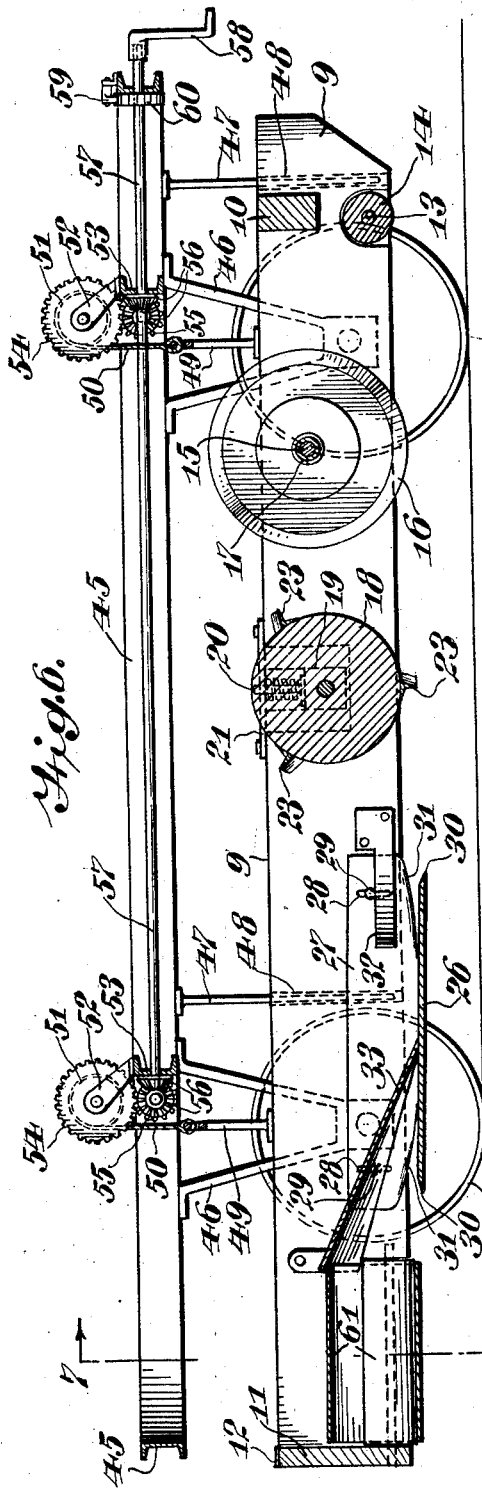
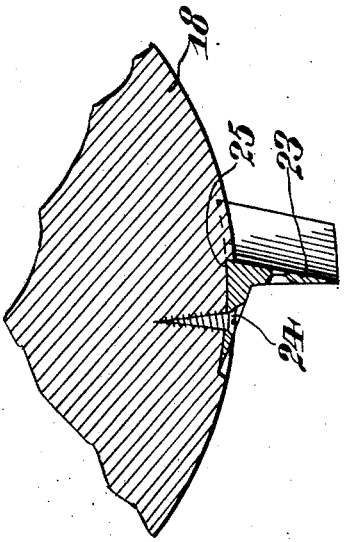
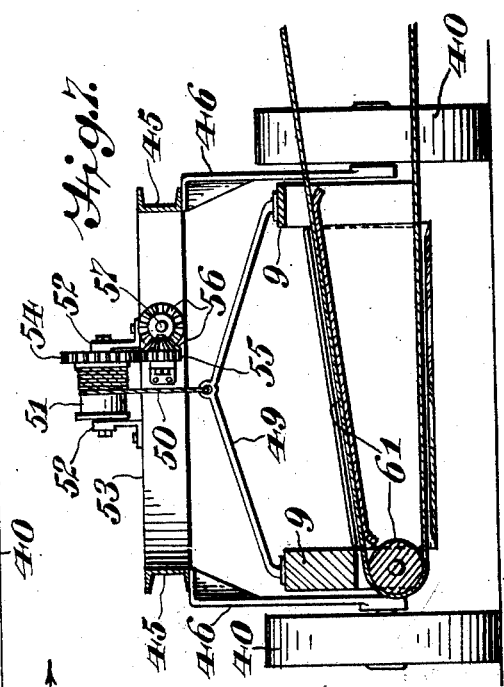
INVENTOR:
Joseph C. Watson,
BY Alfred J. Bratton
ATTORNEY Patented Mar. 26, 1929.

1,706,831

UNITED STATES PATENT OFFICE.

JOSEPH C. WATSON, OF PHILADELPHIA, PENNSYLVANIA.

SOD-CUTTING MACHINE.

Application filed November 21, 1927. Serial No. 234,699.

This invention relates to machines or devices for cutting and peeling grass-sod for use in landscape gardening and so forth, and it has for an object the provision of a mobile sod-cutter adapted for draft by a tractor.

Another object is the provision of a sod-cutting machine which is adapted to not only continuously cut sod of predetermined dimensions, but one which will concurrently completely sever the same from the ground ready for manual stacking, or elevation into an appropriate transporting means.

A further aim of this invention is the provision of a machine of the typified character incorporating means whereby the respective cutter devices are individually adjustable, while clogging of such cutters is prevented by novel means.

A still further object of my invention is the provision of a sod-cutting machine which can be readily moved to and from its place of operation, without recourse to the use of a transporting vehicle such as a truck or the like.

Other objects and advantages of my invention will be apparent as it is better understood from the following description, which when considered in conjunction with the accompanying drawings fully explain practical embodiments thereof, whereas the appended claims serve to define those features deemed patentable.

In the drawings:

Fig. 1 is a top plan view of a sod cutting machine embodying the present improvements.

Fig. 2 is a vertical longitudinal section of the same in operative position.

Fig. 3 is a side elevation of the machine in position for transportation, or in the out of use position.

Fig. 4 is a lateral section taken approximately on the plane designated by the arrowed lines 4—4, in the preceding view.

Fig. 5 is a fragmentary plan view of sod as cut by the machine.

Fig. 6 is a longitudinal sectional view of a modified form of my invention.

Fig. 7 is a transverse section taken substantially as indicated by the plane 7—7 indicated on Fig. 6; and, Fig. 8 is a fragmentary sectional view hereinafter more fully explained.

In the following detailed description, like characters of reference designate the same or corresponding parts in all the views.

Referring more particularly to the drawings my novel sod cutting machine comprises relatively heavy side sills or beams 9, of suitable section, which are rigidly sustained in parallel by front and rear cross-ties 10, 11, respectively, thus providing a substantial frame for housing and supporting the various cutting implements, traction wheels and draft mechanism. Incidentally, the rear cross tie 11 may be reinforced by a clamping strap 12, in an obvious manner, to prevent lateral disruption.

Journaled for free rotation on a transverse shaft 13 in the forward part of the machine is a roller 14 which serves to flatten down the sod to be cut so that, as severed, it is of a uniform thickness; and, in addition said roller functions to crush any unevenness in the growth of the grass being cut which might create clogging matter.

Rearwardly of the roller 14 is a removable shaft 15 on which I freely journal discous rotary cutters 16—with interposition of spacers 17—which serve to effect the longitudinal cutting of the sod $s$; Fig. 5. It will be readily understood that by use of spacers 17 of different lengths the width of the sod $s$ cut may be varied within the confines of the machine side sills 9; whereas, by withdrawing the shaft 15 the several cutters 16 can be easily removed for grinding, or renewal, whenever necessary.

Located to the rear of the cutters just described is a roller 18 of substantial diameter which is journaled in spring influenced bearing blocks 19, and adapted for vertical movement under guidance of upwardly directed rods 20 engaging through apertured plates 21 removably secured to the upper faces of the side sills 9, while lateral displacement of said bearing is prevented by cap plates 22. These plates 21, 22 jointly serve to house the bearing blocks 19 in suitable recesses in the side sills 9, whereby they are effectively protected from fouling or clogging, as well as providing for the same being kept adequately lubricated with suitable grease. The roller 18 is also fitted with longitudinally directed and equally spaced angle-section cutters 23 securely held in place by screws 24—Fig. 8. Particular attention is here directed to the fact that the cutters 23, which form the transverse cutting of the sod, are disposed slightly spiral relative to the axis of the roller 18 so that in operation they effect a slightly rolling cut, in contradistinction to what may be conveniently termed a directly thrusting cut, whereby undue strains on the bearing springs is minimized. Furthermore by making the cutters 23 of the section shown they are rendered reversible, and by bedding the same in grooves 25 in the roller 17 they are effectively prevented from displacement, while the cutting edge not in actual use is protected from damage.

Still further to the rear of the roller 18 just described I mount the plate-like slicing cutter 26 for undercutting the sod s. This slicing cutter 26, it is to be remarked, is provided with vertically directed flanges 27 having slots 28 therein, whereby said cutter is rigidly clamped intermediate the side sills 9 by appropriate lock screws or bolts 29 at the requisite depth below the bottom of the said sills, to cut sod of the desired thickness. Attention is also drawn to the profile of the slicing cutter 26, the same being formed with opposedly directed obtuse cutting edges 30 with the angular points coinciding with the median of the machine, whereby the work is more effectively carried out, and lateral irregularities avoided. It is further to be remarked that the lower edges of the flanges 27 are sharpened at 31 to constitute trimming blades, while in advance of the cutter 26, at each side of the machine I attach an inwardly converging deflector or finger member 32 that functions to move the grass blades inwards away from the cutting edges 30, 31 with incidental avoidance of clogging at said regions.

Transversely at the back of the machine and between the side sills 9 I appropriately mount a plate platform p, having a forwardly-directed downwardly-inclined apron 33, which engages the slicing cutter 26, and serves to elevate the severed sod units s onto said platform 32, for manual, or automatic, removal—as later on explained.

Mobile transportation of my improved sod cutter is provided for through the medium of forward and rear yoke members 34, 35, respectively, suitably pivoted to the cross-shafts or transverse tie-rods 36 and connected for simultaneous movement by a link 37. The front yoke member 34 is fitted at its free ends with caster or swiveling ground wheels 38, to accommodate turning motions of the machine; while the rear yoke 35 is formed with fork ends 39 journalling freely rotatable ground wheels 40, adapted when the machine is in use for sod cutting to snugly seat in pockets 41, provided for their reception in the outer sides of the side sills 9. From Figs. 2 and 3, it will be clearly seen that the yokes 34, 35 are somewhat curved so that when the machine is elevated—as shown in the latter view—the back ground wheels 40 are moved rearwardly of the pivotal center of the yoke 35 below the side sills 9; while the castor or swivel wheels 38 are located for free steering action. Rocking of the yoke members 34, 35 is effected by means of an operating bar 42 pivoted to the former, while draft for the machine is afforded by means of a frame structure 43 provided medially with a coupler hook 44, to which a tractor draft bar—for example—may be readily attached.

Referring now, more particularly, to Figs. 6 and 7, it will be observed that the form of my sod cutting machine therein illustrated—is in the main—similar to that hereinbefore described. Accordingly, similar characters of reference are applied thereto, and only those differing parts needing explanation will now be described. The essential difference however resides in the provision of the machine with a carrying equipage comprising a frame 45, of standard section material, having depending bearings 46 in which the ground wheels 38, 40—of relatively larger diameter—are appropriately journaled. Guidance of the sod cutter proper vertically relative to the frame 45 is afforded by rods or stanchions 47 engaging in holes 48 bored through the side sills 9. Raising and lowering of the sod cutter is effected through the medium of stirrups 49, secured to the side sills 9, with attached cables 50 secured to winding drums 51 journaled in bearings 52, mounted on the cross members 53 of the frame 45. These winding drums are co-ordinated for co-operative operation by means of gears 54, 55 and miter couples 56 under actuation of a common operating shaft 57, fitted at its forward end with a hand crank 58, while a suitable trip dog 59 engages a ratchet 60 to prevent back motion. In addition to the foregoing, this type of my machine may be fitted with a conveyor attachment 61, in lieu of the platform p hereinbefore described, whereby the cut sod may be elevated into a following truck and thereby dispense with much manual labor, with incidental saving of time and labor.

The operation of my sod cutting machine when drawn along by a tractor—or other means—is as follows:—

The discous cutters 16 will effect longitudinal cleavage of the grass sod, followed by transverse cutting into the units s through the medium of the roll cutter 18, after which slicing or undercutting is effected by the plate blade 26; and final elevation onto the platform p or conveyor 61 by the apron 33.

Of course the construction and arrangement of the machine may be modified in accordance with size and form of sods it is desired to cut, therefore I do not desire to limit myself to the precise details described and shown, as minor changes may be made without departing from the essential features as defined by the subjoined claims.

Having thus described my invention what I claim, is:—

1. A sod-cutting machine comprising a wheeled frame, a roller journaled forwardly therein having its surface co-planar with the lower edges of said frame, discous cutters journaled in the frame for effecting longitudinal cutting, a roller to the rear thereof having reversible cutters adapted to sever the sod transversely, a reversible plate cutter supported in the frame rearwardly of the transverse cutter, a receiving platform at the back of the frame with means for elevating cut sod thereon, and means for raising and lowering the frame relative to the wheel base.

2. A sod-cutting machine comprising a frame, a surface roller journaled forwardly therein, discous cutters freely journaled in the frame for effecting longitudinal cuts with capacity for special variation, a roller to the rear thereof having reversible angle-section cutters for severing the sod transversely, a reversible plate cutter supported in the frame rearwardly of the transverse roller cutter, a receiving platform having an inclined apron cooperative with the plate cutter to elevate the cut sod units for removal from the machine, overshot yokes pivoted to the frame aforesaid having supporting wheels journaled at their free ends, and means co-ordinating said yokes for simultaneous movement to raise and lower the frame for the purposes specified.

3. A sod-cutting machine comprising a frame, a surface roller journaled forwardly therein, discous cutters freely journaled in the frame for effecting longitudinal cuts with capacity for special variation, a roller to the rear thereof having reversible angle-section cutters for severing the sod transversely, said roller being journaled in spring influenced bearings with capacity for vertical movement, a reversible plate cutter supported in the frame rearwardly of the transverse roller cutter, a receiving platform having an inclined apron cooperative with the plate cutter to elevate the cut sod units for removal from the machine, over-shot yokes pivoted to the frame aforesaid having supporting wheels journaled at their free ends, and means co-ordinating said yokes for simultaneous movement to raise and lower the frame for the purposes specified.

4. A sod-cutting machine comprising a frame, a surface roller journaled forwardly therein, discous cutters freely journaled in the frame for effecting longitudinal cuts with capacity for special variation, a roller to the rear thereof having reversible angle-section cutters for severing the sod transversely, said roller being journaled in bearings housed in the frame under spring compression and the angle-section cutters disposed slightly spiral relative to the axis of the roller, a reversible plate cutter supported in the frame rearwardly of the transverse roller cutter, a receiving platform having an inclined apron cooperative with the plate cutter to elevate the cut sod units for removal from the machine, over-shot yokes pivoted to the frame aforesaid having supporting wheels journaled at their free ends, and means co-ordinating said yokes for simultaneous movement to raise and lower the frame for the purposes specified.

5. A sod-cutting machine comprising a frame, a surface roller journaled forwardly therein, discous cutters freely journaled in the frame for effecting parallel longitudinal cuts and spacers controlling the distance intervening said cuts, a spring influenced roller to the rear thereof having slightly spiralized angle-section reversible cutters adapted to sever the sod transversely, a reversible plate cutter supported in the frame rearwardly of the transverse roller cutter, said plate cutter being vertically adjustable and having opposedly directed obtuse-angled knife edges merging into longitudinal cutting edges, a receiving platform and inclined apron for elevating the cut sod units from the plate cutter for removal from the machine, front and rear overshot yokes pivoted to the frame with freely journaled supporting wheels at their free ends, means co-ordinating said yokes for simultaneous movement to raise and lower the frame relative to ground level, and draft means whereby the machine may be operated or transported from place to place.

6. A sod-cutting machine comprising a frame, a surface roller journaled forwardly therein, discous cutters freely journaled in the frame for effecting parallel longitudinal cuts and spacers controlling the distance intervening said cuts, a spring influenced roller to the rear thereof having slightly spiralized angle-section reversible cutters adapted to sever the sod transversely, a reversible plate cutter supported in the frame rearwardly of the transverse roller cutter, said plate cutter being vertically adjustable and having opposedly directed obtuse-angled knife edges merging into longitudinal cutting edges, a receiving platform and inclined apron for elevating the cut sod units from the plate cutter for removal from the machine, front and rear overshot yokes pivoted to the frame, steering and supporting wheels freely journaled at the free ends of said yokes with the latter adapted to seat in pockets in the frame when not in use, and means co-ordinating said yokes for simultaneous movement to raise and lower the frame relative to the ground level, for the purposes specified.

7. A sod-cutting machine comprising a frame, a surface roller journaled forwardly therein, discous cutters freely journaled in the frame for effecting parallel longitudinal cuts and spacers controlling the distance intervening said cuts, a spring influenced roller to the rear thereof having slightly spiralized angle-section reversible cutters adapted to sever the sod transversely, a reversible plate cutter supported in the frame rearwardly of the transverse roller cutter, said plate cutter being vertically adjustable and having opposedly directed obtuse-angled knife edges merging into longitudinal cutting edges, a receiving platform and inclined apron for elevating the cut sod units from the plate cutter for removal from the machine, inwardly converging fingers co-operative with the plate cutter knife edges to prevent clogging of the same where they merge into the longitudinal cutting edges thereof, front and rear overshot yokes pivoted to the frame, steering and supporting wheels freely journaled at the free ends of said yokes with the latter adapted to seat in pockets in the frame when not in use, and means co-ordinating said yokes for simultaneous movement to raise and lower the frame relative to the ground level, for the purposes specified.

8. In a sod cutting machine of the type described, cutting means comprising discous members journaled for effecting longitudinal cutting, a roller having reversible cutters adapted to sever the sod transversely, and an adjustable reversible slicer adapted to under-cut the sod.

9. In a sod cutting machine of the type described, cutting means comprising discous members journaled for effecting longitudinal cutting, a roller having reversible cutters adapted to sever the sod transversely, and a vertically adjustable reversible slicer with opposedly-directed obtuse-angled knife edges adapted to under-cut the sod.

10. In a sod cutting machine of the type described, cutting means comprising discous members journaled for effecting longitudinal cutting, a roller having reversible cutters adapted to sever the sod transversely, and a vertically adjustable reversible slicer with opposedly-directed obtuse-angled knife edges merging into longitudinal cutting portions for under-cutting the sod.

11. In a sod cutting machine of the type described, cutting means comprising discous members journaled for effecting longitudinal cutting, a roller having reversible cutters adapted to sever the sod transversely, a vertically adjustable reversible slicer with opposedly-directed obtuse-angled knife edges merging into longitudinal cutting portions for under-cutting the sod, and inwardly converging fingers co-operative with the slicer knife edges to prevent clogging of the cut sod.

12. In a sod cutting machine of the type described, cutting means comprising discous members journaled for effecting longitudinal cutting, a roller having reversible cutters adapted to sever the sod transversely, a vertically adjusted reversible slicer with opposedly-directed obtuse-angled knife edges merging into longitudinal cutting portions for under-cutting the sod, inwardly converging fingers co-operative with the slicer knife edges to prevent clogging of the cut sod with the longitudinal cutting portions thereof, and an inclined apron adapted to elevate the severed sod units from the slicer aforesaid for removal from the machine.

In testimony whereof I have signed my name at Philadelphia, Pennsylvania, this 3rd day of November, 1927.

JOSEPH C. WATSON.